United States Patent [19]
Aoki et al.

[11] Patent Number: 5,771,331
[45] Date of Patent: Jun. 23, 1998

[54] REPRODUCTION OF INFORMATION USING A RING BUFFER WITH READ AND WRITE POINTERS SEPARATED FROM EACH OTHER BY SUBSTANTIALLY HALF OF THE TOTAL RING BUFFER CAPACITY

[75] Inventors: Nobuyuki Aoki, Kanagawa; Daisuke Hiranaka, Tokyo; Hajime Nitta, Kanagawa; Kiyoshi Ota, Tokyo, all of Japan

[73] Assignee: Sony Corporation, Tokyo, Japan

[21] Appl. No.: 520,837

[22] Filed: Aug. 29, 1995

[30]     Foreign Application Priority Data

Sep. 5, 1994  [JP]  Japan ................................... 6-234524
Sep. 5, 1994  [JP]  Japan ................................... 6-234527

[51] Int. Cl.[6] .................................................. H04N 5/783
[52] U.S. Cl. .............................. 386/68; 386/111; 386/91
[58] Field of Search ................................... 386/111, 124, 386/125, 68, 98, 91, 46, 113; 369/47; H04N 5/783, 5/92

[56]                References Cited

U.S. PATENT DOCUMENTS 4,698,698  10/1987  Collins ..................................... 386/113
4,931,879   6/1990  Koga et al. ............................... 386/111
5,471,450  11/1995  Yonemitsu et al. ......................... 369/60
5,557,419   9/1996  Muto ........................................ 386/111

FOREIGN PATENT DOCUMENTS 0 522 853 A2  6/1993  European Pat. Off. .

*Primary Examiner*—Thai Tran
*Assistant Examiner*—Huy Nguyen
*Attorney, Agent, or Firm*—Frommer Lawrence & Haug LLP; William S. Frommer

[57]            ABSTRACT

A data reproducing method and apparatus for providing special reproductions such as a reverse reproduction quickly when it is specified. In the data reproducing apparatus comprising a demodulator for demodulating data read out of a digital video disk by a pickup, a buffer for temporarily storing the demodulated data and a decoder for decoding the data read out of the buffer into original video signals, further included is a control circuit for controlling the buffer so that an unread data area and an already-read data area in the buffer take about half of the total memory capacity, respectively. As a result, the data necessary for reverse reproduction or the like is present in the buffer, allowing the special reproduction to run quickly.

8 Claims, 13 Drawing Sheets

Conceptual Diagram of DVD Player

Conceptual Diagram of DVD Player

FIG. 2

| Memory State | M1 | M2 | M3 |
|---|---|---|---|
| 1 | $I_0$ | $B_{-2}$ | $B_{-1}$ |
| 2 | $I_0$ | $P_0$ | $B_{-1}$ |
| 3 | $I_0$ | $P_0$ | $B_0$ |
| 4 | $I_0$ | $P_0$ | $B_1$ |
| 5 | $P_1$ | $P_0$ | $B_1$ |
| 6 | $P_1$ | $P_0$ | $B_2$ |
| ⋮ | | | |

During Normal Reproduction

FIG. 3

| Memory State | M1 | M2 | M3 |
|---|---|---|---|
| 0 | $I_1$ | $P_1$ | $B_3$ |
| 1 | $I_0$ | $P_1$ | $B_3$ |
| 2 | $I_0$ | $P_1$ | $P_3$ |
| 3 | $B_2$ | $P_1$ | $P_0$ |
| 4 | $B_2$ | $I_0$ | $P_0$ |
| 5 | $B_1$ | $I_0$ | $P_0$ |
| 6 | $B_0$ | $I_0$ | $P_0$ |
| ⋮ | | | |

During Reverse Reproduction

Motion of WP and RP During Normal Reproduction

Motion of WP During Reverse Reproduction

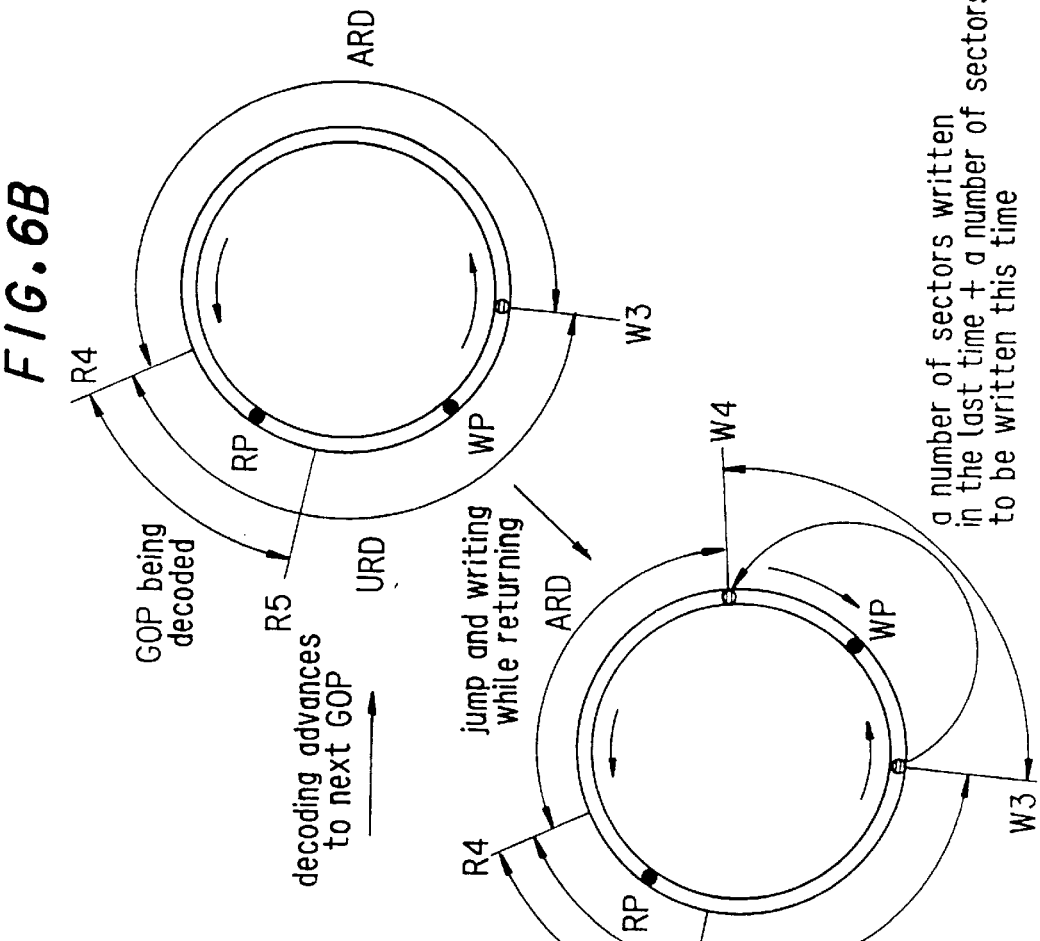
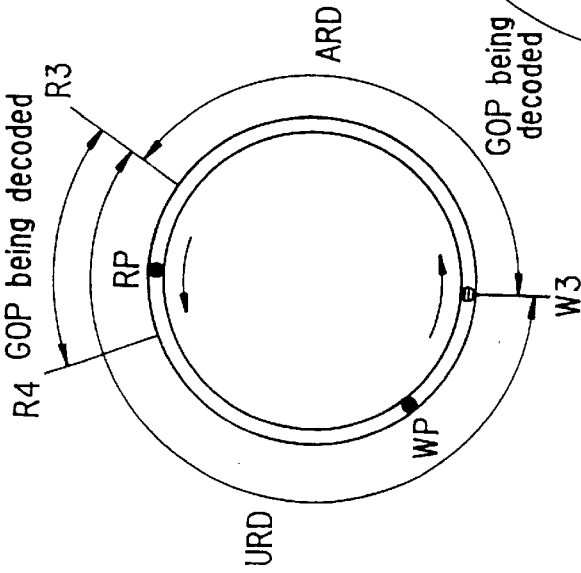
Motion of WP and RP During Reverse Reproduction

Motion of RP During Reverse Reproduction

Motion of WP During Reverse Reproduction

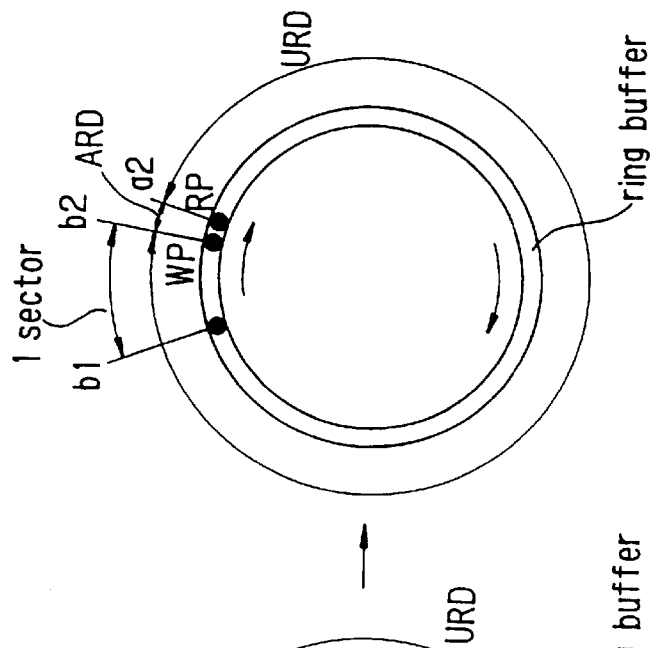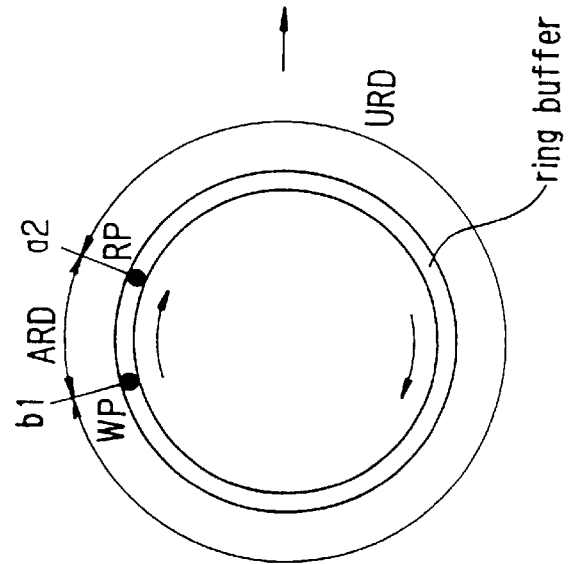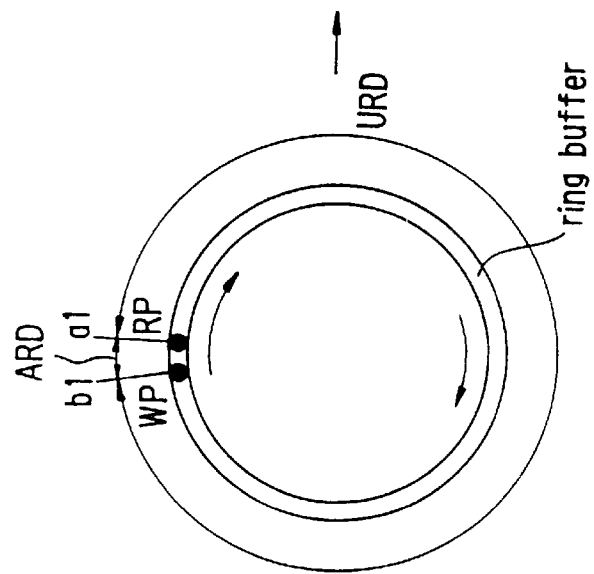

REPRODUCTION OF INFORMATION USING A RING BUFFER WITH READ AND WRITE POINTERS SEPARATED FROM EACH OTHER BY SUBSTANTIALLY HALF OF THE TOTAL RING BUFFER CAPACITY

BACKGROUND OF THE INVENTION

1. Field of the Invention

The present invention relates to a disk data reproducing method and a disk data reproducing apparatus suited for reproducing data such as images and sounds recorded in an optical disk, a magneto-optic disk or the like and more particularly to a data reproducing method and a data reproducing apparatus which enable to run special reproductions such as a reverse reproduction quickly.

2. Description of the Related Art

The MPEG (Motion Picture coding Experts Group) method has been proposed as a method for compressing and coding digital image signals recorded in a conventional digital video disk (hereinafter referred to as a DVD). Then, an example of a MPEG encoder will be explained below with reference to FIG. 9.

The MPEG encoder is a type of encoder which is adapted to compress signals by predictive coding, wherein digitized image input signals are formed into blocks, each block (MB) being a minimum unit of motion compensative prediction, and motion vectors for the motion compensative prediction are detected per each block in a motion detecting circuit 101.

While this block is predictive-coded by the ensuing predictive coding section, it is classified into four blocks of (1) an intra-block in which DCT (Discrete Cosine Transform) is directly implemented on the image input signals, (2) a forward block in which prediction is made only from the front direction, (3) a backward block in which prediction is made only from the rear direction, and (4) a bi-directive block in which prediction is made from both directions.

That is, a DCT section 103 implements the DCT which is one type of Fourier transform, and a quantization circuit 104 quantizes DCT coefficients of that result. After the quantization, a variable length coding means 109 implements variable length coding by assigning codes whose lengths vary corresponding to a probability of occurrence. An inverse quantization circuit 105 inverse-quantizes the quantized signals, and an inverse DCT section 106 implements an inverse DCT. Then, an output from a frame memory predictor 108 is added to it to reproduce the original image signals. The reproduced image signals are supplied to a subtracter 102 as prediction signals.

Predictive coding signals output from the variable length coding means 109 are multiplexed with prediction mode information and motion vector information in multiplexing means 110. Such multiplexed data is generated at irregular rates, so that it is output to and temporarily stored in a buffer 111 so that its encoding rate becomes constant. Note that it is also possible to control a coding amount by changing a quantization scale factor q of the quantizing means 104 in response to a coding amount stored in the buffer 111 to level off the average of the coding rates.

FIG. 10a shows a structure of inter-frame prediction thus compressed and coded by the MPEG method. In the figure, one GOP (Group Of Pictures) is composed of nine frames for example: one frame of I picture, two frames of P picture and six frames of B picture. Note that GOP is a unit of coding into which one sequence of motion pictures is divided. I picture is a predictive-coded image within the frame, P picture is an inter-frame predictive-coded image predicted with reference to the preceding frame already coded (I picture or P picture) time-wise and B picture is an inter-frame predictive-coded image predicted with reference to two frames of the preceding and succeeding frames time-wise.

That is, as shown in the figure by arrows, I picture $I_0$ is predictive-coded only within that frame, P picture $P_0$ is inter-frame predictive-coded with reference to I picture $I_0$, and P picture $P_1$ is inter-frame predictive-coded with reference to P picture $P_0$. Further, B pictures $B_0$ and $B_1$ are inter-frame predictive-coded with reference to two pictures of I picture $I_0$ and P picture $P_0$, and B pictures $B_2$ and $B_3$ are inter-frame predictive-coded with reference to two pictures of P picture $P_0$ and P picture $P_1$. Pictures thereafter are created through the predictive-coding in the same manner.

By the way, in decoding the pictures thus predictive-coded, although I picture may be decoded by itself because I picture is predictive-coded within the frame, P picture needs the preceding I picture or P picture in decoding it because P picture is predictive-coded with reference to the preceding I picture or P picture, and B picture needs the preceding and succeeding I picture or P picture in decoding it because B picture is predictive-coded with reference to the preceding or succeeding I picture or P picture. Then, the pictures are rearranged as shown in FIG. 10b so as to be able to first decode those pictures needed in subsequent decoding.

As shown in the figure, this rearrangement is made so that I picture $I_0$ precedes B pictures $B_{-1}$ and $B_{-2}$ because I picture $I_0$ is necessary in decoding B pictures $B_{-1}$ and $B_{-2}$, so that P picture $P_0$ precedes B pictures $B_0$ and $B_1$ because P picture $P_0$ is necessary in decoding B pictures $B_0$ and $B_1$, so that P picture $P_1$ precedes B pictures $B_2$ and $B_3$ because P picture $P_1$ is necessary in decoding B pictures $B_2$ and $B_3$, and so that I picture $I_1$ precedes B pictures $B_4$ and $B_5$ because I picture $I_1$ is necessary in decoding B pictures $B_4$ and $B_5$.

While I pictures, P pictures and B pictures are recorded in the DVD in the sequence as shown in FIG. 10b, their coding amount is not constant among each picture and varies corresponding to a complexity and flatness of the image since those pictures are predictive-coded as described before. Then, in order to be able to readily handle the data, the data are recorded by means of a sector which is defined by a certain coding amount in recording those pictures once in the DVD. FIG. 11 shows a mode for recording the data by means of the sector, wherein I picture $I_0$, for example, is recorded in Sector m, Sector (m+1) and a partial area of Sector (m+2), and B picture $B_{-2}$ is recorded in the remaining area of Sector (m+2) and Sector (M+3). Thereafter, each picture is recorded sequentially in respective sectors, and one GOP is recorded in Sectors m through (m+13) in this example. However, GOP is not always recorded in such number of sectors, and generally the number of sectors in which one GOP is recorded varies because the coding amount varies due to the complexity and flatness of each image.

The data in the sector units read out of the DVD is stored temporarily in storage means which is represented imaginarily as having a ring shape and is called a ring buffer. Operations of a read pointer and a write pointer in the ring buffer will be explained below with reference to FIG. 12. In FIG. 12a, the read pointer RP is positioned at an address position a1 in the ring buffer and the write pointer WP is positioned at an address position b1 slightly before a1. The data in the sector is supplied to the decoder as the read pointer moves clockwise in the figure, reading the data out of the ring buffer.

The write pointer WP is controlled so as to be positioned slightly before a1 time-wise to increase an unread area (URD) as much as possible and not to be short of data to be reproduced. Accordingly, an already-read area (ARD) turns out to be a small area between a1 and b1, and it is also possible to control the pointers so that this area becomes zero. FIG. 12b shows a state wherein the read pointer RP has advanced to read the data out of the ring buffer, advancing its address position from a1 to a2. Due to that, the URD area has become smaller correspondingly, increasing the ARD area on the other hand.

Then, data is written into the ring buffer while advancing the write pointer WP clockwise so that the unread area URD increases as shown in FIG. 12c. The data here is new data read out of the disk. Thereby, the address position of the write pointer WP advances from b1 to b2, reducing the ARD area and increasing the URD area that much. Thus, a large URD area is always maintained in the ring buffer by making such control.

However, there has been a problem that when special reproductions such as a reverse reproduction is to be made when data in sector units recorded in the DVD is being read out of the ring buffer to reproduce video signals, the normal reproduction cannot be switched to the reverse reproductions smoothly. This is so because there exists almost no data to be reproduced in the reverse direction (i.e. data in the ARD area) in the ring buffer at the moment when the mode is switched to the backward reproduction, and it is necessary to wait for a supply of data read by accessing the DVD. That is, although it is necessary to read data of the preceding GOP time-wise following the current GOP by accessing the DVD by the pickup in order to decode video signals to be displayed on the display section during the reverse reproduction, it takes time to read the data because that reading is done mechanically, and it also takes time to decode pictures composing the read GOPs to obtain video signals.

The reason why it takes time for decoding pictures will be explained below. Assume here that a GOP preceding the current GOP is composed of I picture $I_0$ through $B_5$ as shown in FIG. 10a. Then, in order to perform the reverse reproduction, it is necessary to display an image of decoded B picture $B_5$ after an image of decoded I picture $I_1$ of the current GOP and to display, following that, images of decoded B picture $B_4$, P picture $P_1$, B picture $B_3$, B picture $B_2$, P picture $P_0$, B picture $B_1$, B picture $B_0$ and I picture $I_0$.

Because B picture $B_5$ and B picture $B_4$ are predicted with reference to I picture $I_1$ and P picture $P_1$, data of I picture $I_1$ and P picture $P_1$ are necessary for decoding them. However, because P picture $P_1$ is predicted with reference to P picture $P_0$, and P picture $P_0$ is predicted with reference to I picture $I_0$, it is necessary to decode P picture $P_0$ with reference to I picture $I_0$ and to decode P picture P1 with reference to P picture $P_0$ after all. It is thus necessary to make reference to I picture $I_1$ and P picture $P_1$ to decode B picture $B_5$ and B picture $B_4$, so that it takes time for decoding the pictures.

Accordingly, it is an object of the present invention to provide a data reproducing method and a data reproducing apparatus which enable to run a special reproduction such as the reverse reproduction quickly.

SUMMARY OF THE INVENTION

In order to achieve the aforementioned goal, in a data reproducing method of the present invention for reproducing original video signals by demodulating and writing data read out of a disk by a pickup into storage means and by decoding the data read out of the storage means, the storage means is controlled so that an unread data area and an already-read data area in the storage means take about half of a total memory capacity, respectively.

Further, in the data reproducing method, the data is written to the storage means in sector units composed of a fixed data amount. A write pointer is moved to an address position in the reproducing direction by a number of sectors of the sum of a number of sectors written in the last time and a number of sectors to be written this time when a reverse reproduction mode is specified, and the number of sectors to be written this time is written to the storage means in the direction reverse to the reproducing direction from the address position.

Further, in a data reproducing apparatus of the present invention for achieving the aforementioned goal, comprising demodulating means for demodulating data read out of a digital video disk by a pickup, storage means for temporarily storing the demodulated data and a decoder for decoding the data read out of the storage means into original video signals, the apparatus is provided with a control circuit for controlling the storage means so that an unread data area and an already-read data area in the storage means take about half of a total memory capacity, respectively.

The control circuit in the data reproducing apparatus writes the data to the storage means in sector units composed of a fixed data amount data. It moves a write pointer to an address position in the reproducing direction by a number of sectors of the sum of a number of sectors written in the last time and a number of sectors to be written this time when the reverse reproduction mode is specified, and writes the number of sectors to be written this time to the storage means in the direction reverse to the reproducing direction from the address position.

In order to achieve the aforementioned goal, in a data reproducing method of the present invention for reproducing image signals by demodulating data read out of a disk by a pickup and by decoding it via a buffer, the buffer has a capacity capable of storing at least two GOPs composed of a plurality of frames, and data of at least one GOP including a GOP preceding time-wise a GOP being decoded is read out of the disk and is stored in the buffer when a still mode is specified to be ready for a special reproduction mode. In the data reproducing method, the special reproduction mode is a reverse reproduction mode.

In a data reproducing apparatus of the present invention for achieving the aforementioned goal, comprising demodulating means for demodulating data read out of a disk by a pickup, a buffer for temporarily storing the demodulated data and a decoder for decoding the data read out of the buffer into image signals, the buffer has a capacity capable of storing at least two GOPs composed of a plurality of frames, and data of at least one GOP including a GOP preceding time-wise a GOP being decoded by the decoder is read out of the disk and is stored in the buffer when a still mode is specified to be ready for the special reproduction mode. In the data reproducing apparatus, the special reproduction mode is a reverse reproduction mode.

According to the present invention, the writing/reading of the storage means is controlled so that the unread data area and the already-read data area in the storage means take about half of a total memory capacity, respectively, so that data necessary for the reverse reproduction or the like is left in the storage means and the special reproduction can be performed quickly. As a result, it becomes possible to switch the mode from the special reproduction to the normal reproduction quickly. Thus, according to the present invention, the number of disk access operations is reduced, and the special reproduction may be performed just by controlling the buffer in the normal reproduction mode by storing past data within the buffer.

According to the present invention, because the special reproduction mode such as the backward reproduction is more likely to be selected after the still mode is selected in general, the preceding GOP is read when the still mode is specified. Then, because the preceding GOP has been already read at the time when the special reproduction mode is specified, images reproduced in the special reproduction mode may be displayed quickly on the screen.

Further, if the capacity of the buffer is sufficiently large, it becomes possible to quickly accommodate frame feeding or variable-speed reproductions such as slow reproduction of ½ or ¼ of normal speed and double speed not only in the reverse direction but also in the normal direction by storing a plurality of GOPs before and after a GOP, containing images being currently output, within the buffer. Thus, the present invention allows to reduce accesses to the disk and to switch to the special reproduction quickly just by controlling the buffer in the normal reproduction mode by storing past data, more or less, always within the buffer.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIG. 2 is a table showing decoded frames stored in frame memories during the normal reproduction in the data reproducing apparatus of the present invention;

FIG. 3 is a table showing decoded frames stored in the frame memories during the reverse reproduction in the data reproducing apparatus of the present invention;

FIGS. 6a, 6b and 6c are diagrams for explaining motions of the write pointer and the read pointer during the reverse reproduction in the data reproducing apparatus of the present invention;

FIGS. 12a, 12b and 12c are diagrams for explaining motions of the read pointer and the write pointer in a ring buffer;

DETAILED DESCRIPTION OF PREFERRED EMBODIMENT

Figure 1:
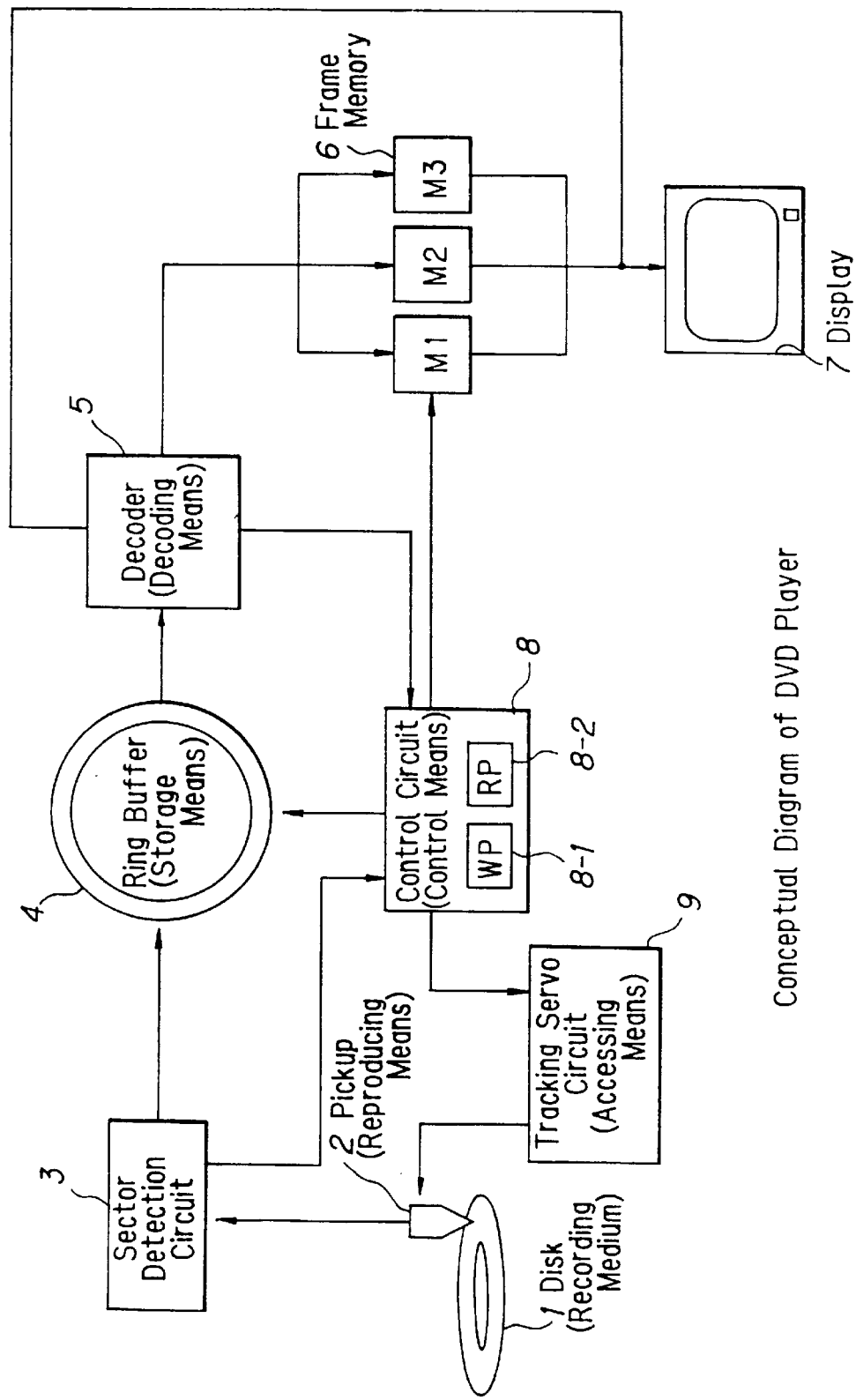
FIG. 1 is a conceptual view showing a structure of one preferred embodiment of a data reproducing apparatus of the present invention.

FIG. 1 is a conceptual view of a data reproducing apparatus (DVD player) according to one preferred embodiment of the present invention. In the figure, a disk (DVD) 1 is a recording medium for recording digital video data, digital audio data or the like compressed and coded by the MPEG method in sector units a pickup 2 is reproducing means for accessing the disk 1 and reading the digital data recorded therein; a sector detecting circuit 3 detects a sector sync and a sector address from the digital data read out of the disk 1, a ring buffer 4 is memory means into which the data read out of the disk 1 in sector units is written under control of a control circuit 8 and for supplying the read data to a decoder 5 as necessary and the decoder 5 decodes the data supplied in sector units into video signals to be displayed on a display unit.

A frame memory 6 stores three frames decoded by the decoder 5; a display 7 displays the video signals supplied from the frame memory 6; the control circuit 8 controls tracking, threading, focus or the like by sending various control signals to a tracking servo circuit 9, as assessing means, or the like and controls reading/writing of the ring buffer 4; and the tracking servo circuit 9 controls tracking of the pickup 2 to access the disk 1 under the control of the control circuit 8.

Figure 11:
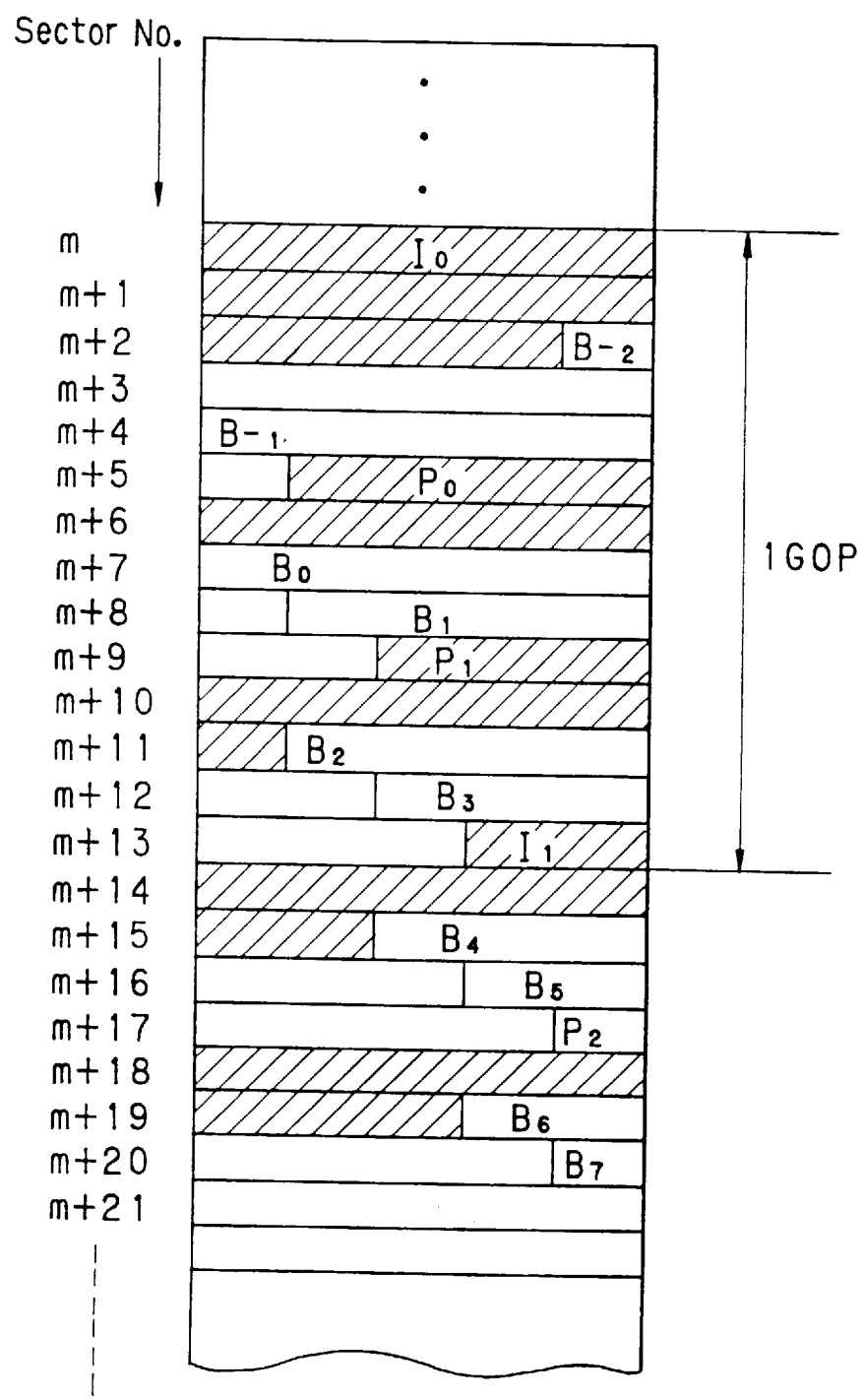
FIG. 11 is a diagram showing a relationship between sectors recorded in a disk and pictures composing a GOP.

An operation of the data reproducing apparatus constructed as described above will be explained below. The disk 1 is controlled so as to turn with a predetermined number of revolutions by a spindle motor not shown. The compressed and coded digital data recorded in tracks of the disk 1 is read when laser beam is irradiated on to the tracks from the pickup 2. This digital data is recorded in the unit of fixed length sector as shown in FIG. 11, as described before, and the sector sync and sector head are appended at the head of each sector.

The digital data read by the pickup 2 is input to the sector detecting circuit 3, wherein delimitations of the sectors are detected when the sector syncs are detected and the sector addresses are detected from the sector heads. They are supplied to the control circuit 8. Note that the focus control and the tracking control of the pickup 2 are carried out by the tracking servo circuit 9 and others under system control not shown based on focus error signals and tracking error signals obtained from information read out of the pickup 2.

Then, the control circuit 8 controls writing of the data in sector units into the ring buffer 4 based on the detected sector address. A writing address at this time is indicated by a write pointer (WP) within the control circuit 8. Note that the buffer 4 has a storage capacity capable of storing at least two GOPs of digital data. GOPs composed of pictures in the sequence shown in FIG. 10b described above for example are read out of the ring buffer 4 in the sector units and are supplied to the decoder 5. Then, I pictures, P pictures and B pictures composing the GOP are decoded to be written sequentially to the frame memory 6.

Figure 10A:
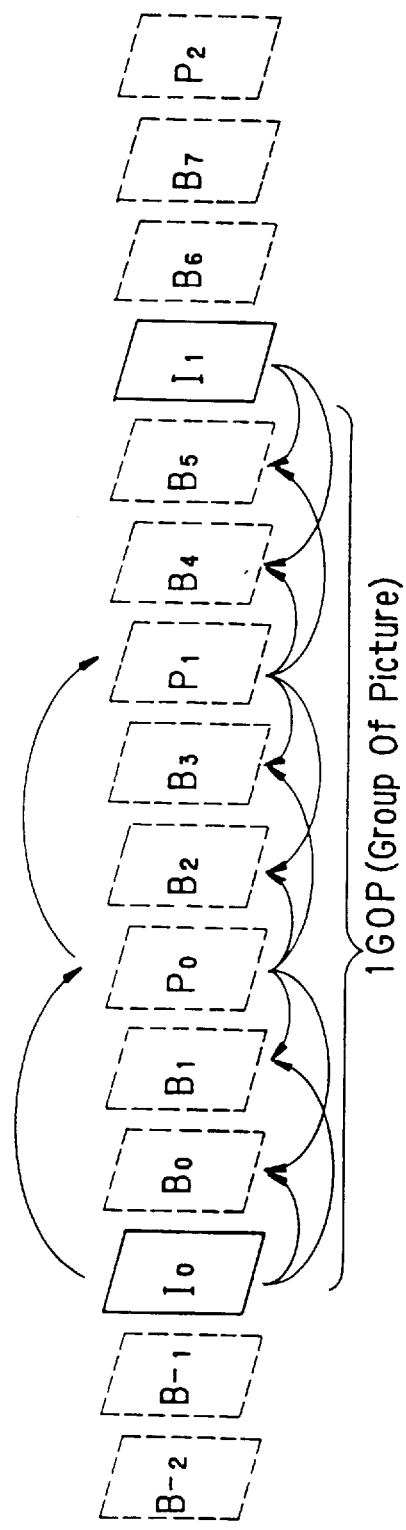
FIGS. 10a and 10b are diagrams showing a structure of inter-frame prediction and a structure of recorded frames in a GOP.
Figure 10B:
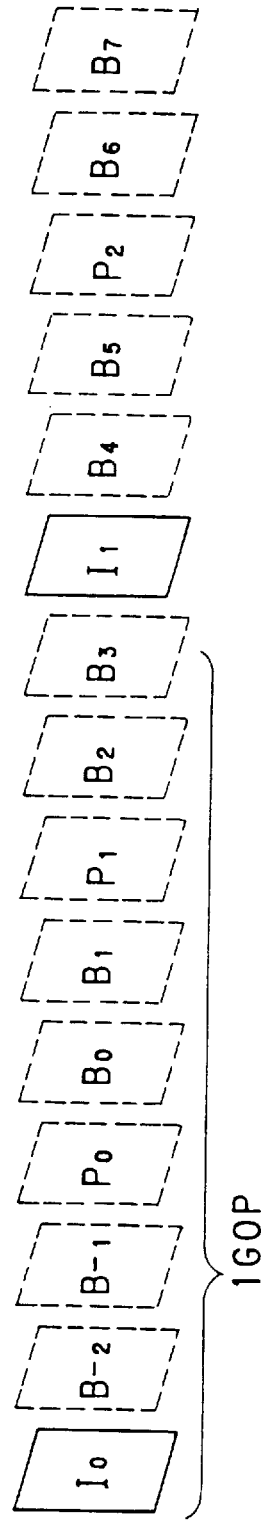

The pictures are output from the decoder 5 in the picture sequence shown in FIG. 10b and are written to each frame memory M1, M2 and M3 composing the frame memory 6. FIG. 2 shows an example of decoded frames written to the frame memories M1, M2 and M3 during the normal reproduction. FIG. 2 will be explained below with reference to FIGS. 10a and 10b. In State 1, $I_0$ frame obtained by decoding I picture $I_0$ is written to the frame memory M1, and B pictures $B_{-2}$ and $B_{-1}$ decoded with reference to P frame of decoded P picture preceding I picture $I_0$ and to the decoded $I_0$ fame within the frame memory M1 are written to the frame memories M2 and M3, respectively. In State 1, those frames are rearranged into the original image sequence of B-2, B-1 and IO frames as shown in FIG. 10a and are sent from the frame memories M1, M2 and M3 to the display 7 to be displayed.

Next in State 2, the sector of P picture $P_0$ is read out of the ring buffer 4 and P picture$_\phi$ is decoded with reference to $I_0$ frame within the frame memory M1 and is written to the frame memory M2. Advancing to State 3, the sector of B picture $B_0$ is read out of the ring buffer 4, and B picture $B_0$ is decoded with reference to $I_0$ frame within the frame memory M1 and $P_0$ frame within the frame memory M2, and is written to the frame memory M3. Then, $B_0$ frame is read out of the frame memory M3 and is sent to the display 7 to display its image.

In State 4, the sector of B picture $B_1$ is read out of the ring buffer 4, and B picture $B_1$ is decoded with reference to $I_0$ frame within the frame memory M1 and $P_0$ frame within the frame memory M2, and is written to the frame memory M3. Then, they are sent in sequence of B1 and $I_0$ frames from the frame memories M3 and M1 to the display 7 to display their images.

In the following State 5, the sector of P picture $P_1$ is read out of the ring buffer 4, and P picture $P_1$ is decoded with reference to $P_0$ frame within the frame memory M1, and is written to the frame memory M1. In State 6, the sector of B picture $B_2$ is read out of the ring buffer 4, and B picture $B_2$ is decoded with reference to $P_1$ frame within the frame memory M1 and $P_0$ frame within the frame memory M2, and the decoded B picture $B_2$ is written to the frame memory M3. The decoded $B_2$ frame is read out of the frame memory M3 and is sent to the display 7 to display its image. The other pictures are decoded in the same manner and are sent to the display 7 with sequence of B3, P1, B4, B5 frames to display their images sequentially.

Figure 4A:
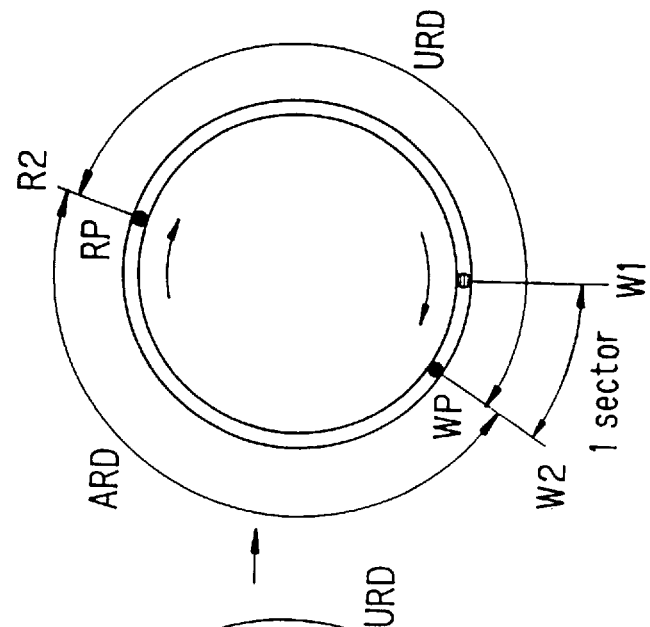
FIGS. 4a, 4b and 4c are diagrams for explaining motions of a write pointer and a read pointer during the normal reproduction in the data reproducing apparatus of the present invention.

The images are displayed as described above during the normal reproduction. Then, motions of the write pointer WP and the read pointer RP in the ring buffer 4 during the normal reproduction will be explained below with reference to FIGS. 4a, 4b and 4c. FIG. 4a shows a case when the read pointer RP is positioned at an address position R1 and the write pointer WP is positioned at an address position W1. The clockwise direction of the ring buffer 4 in the figure is considered to be the direction of the normal reproduction and writing/reading is performed in this direction. Note that because the address position R1 and the address position W1 are positioned so as to almost face each other across the ring buffer 4, the sizes of an unread data area URD and an already-read data area ARD become almost equal.

Figure 4B:
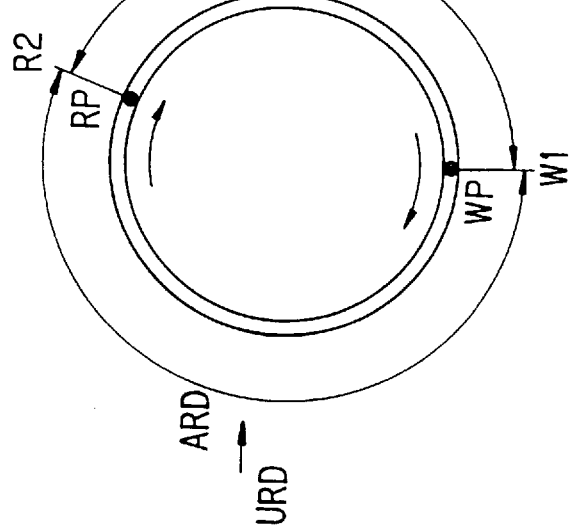
Figure 4C:
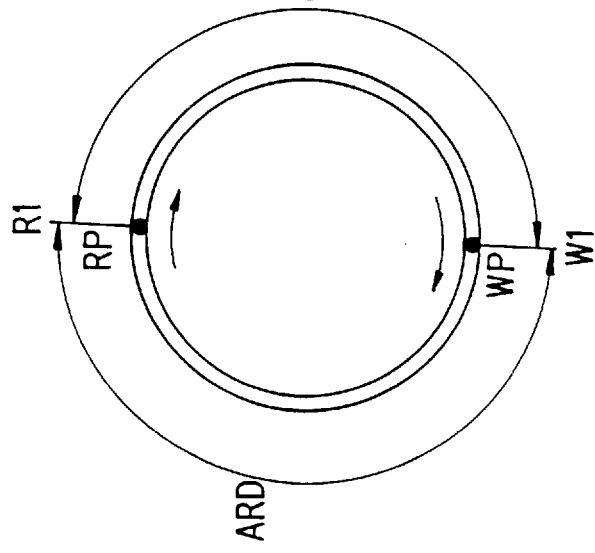

FIG. 4b shows a state in which the read pointer RP advances to an address position R2 to read data out of the ring buffer 4, decreasing the unread data area and increasing the already-read data area. Detecting that state, the control circuit 8 controls the pickup 2 to access the disk 1 to read new data and advances the write pointer WP to an address position W2 shown in FIG. 4c so as to be able to write one sector of read data to the ring buffer 4. Thereby, the sizes of the unread data area and the already-read data area are rendered almost equal again. Note that the control circuit 8 makes such control at all times so that the sizes of the unread data area and the already-read data area always become almost equal. In this case, when no new data is read out of the disk 1, the pickup 2 is controlled so as to read data on the same track.

By the way, when a control button is manipulated to switch the mode from the normal reproduction mode to the reverse reproduction mode for example, it is necessary to decode previous images already reproduced during the normal reproduction in a reversed time sequence and to send the decoded images from the frame memory 6 to the display 7 to display them. However, in the case of the present invention, because the data already read is stored in the already-read data area in the ring buffer 4 as shown in FIG. 4, reversely reproduced images may be quickly displayed on the display 7 just by controlling the reading/writing of the ring buffer 4 so as to accommodate the reverse reproduction without controlling the pickup 2 to return to read new data.

A relationship of pictures decoded by the decoder 5 during the reverse reproduction mode and frames stored in the frame memories M1, M2 and M3 will be explained below with reference to FIG. 3. In State 0 in FIG. 3, I picture $I_1$ is decoded and is stored in the frame memory M1 after finishing decoding up to the frame $B_3$. Because the decoded frames have to be sent to be displayed with the sequence from the right side to the left side in the arrangement shown in FIG. 10a during the reverse reproduction, P1 and B3 frames are sent with a sequence of P1 and B3 from the frame memories M2 and M3 to the display 7 to display their images. Next, because it is necessary to send B2 frame, I picture $I_0$ is read out of the ring buffer 4 at first to be decoded and to be stored in the frame memory M1 (State 1). Following that, P picture $P_0$ is read out of the ring buffer 4 to be decoded with reference to $I_0$ frame and to be stored in the frame memory M3 (State 2). Then, B picture $B_2$ is read out of the ring buffer 4 to be decoded with reference to P1 and P0 frames and to be stored in the frame memory M1. It is then sent to the display 7 to display an image of B2 frame (State 3).

Next, I picture $I_0$ is read out of the ring buffer 4 again to be decoded and to be stored in the frame memory M2 (State 4). Then, B picture $B_1$ is read out of the ring buffer 4 to be decoded with reference to P1 and P0 frames and to be stored in the frame memory M1. It is then sent to the display 7 to display an image of B1 frame (State 5). B picture $B_0$ is read out of the ring buffer 4 to be decoded similarly with reference to P1 and P0 frames and to be stored in the frame memory M1. It is sent to the display 7 to display its image (State 6).

Motions of the write pointer WP and the read pointer RP during such reverse reproduction will be explained below with reference to FIG. 6. In FIG. 6a, a GOP stored in an area from an address position R3 to an address position R4 on the ring buffer 4 is being decoded and the read pointer RP is positioned within the area. An unread data area extends from the address position R3 including the area being decoded to an address position W3, and the remaining area is an already-read data area. Note that the write pointer WP is positioned where it almost faces the address position r3. Because this is in the mode of reverse reproduction, the counterclockwise direction is the reproducing direction on the ring buffer 4.

FIG. 6b shows a state wherein the decoding has advanced to the next GOP. That is, the GOP stored in the area from the address position R4 to an address position R5 is being read out of the ring buffer 4 to be decoded. Because the unread data area becomes small in that state, the control circuit 8 controls the pickup 2 to return to read new data from the disk 1. At the same time, it causes the write pointer WP to jump from the address position W3 to the address position W4 and writes the data read out of the disk 1 to the ring buffer 4 while moving the write pointer WP clockwise. In this case, the write pointer WP is controlled so as to jump by an area into which a number of sectors which is the sum of a number of sectors written in the last time and a number of sectors to be written this time can be written.

By the way, in the compression by the MPEG method, other pictures in a GOP cannot be coded without reading I picture first as described before. Accordingly, the pictures cannot be decoded even if the GOP is read from the posterior pictures sequentially during the reverse reproduction. Then, it is written in advance in a TOC or the like recorded at the head of the disk 1 which sectors is each GOP composed of. The control circuit 8 memorizes that and causes the read pointer RP to jump to a head of a GOP during the reverse reproduction and to return while decoding from I picture to decode a picture to be output next.

Figure 7B:
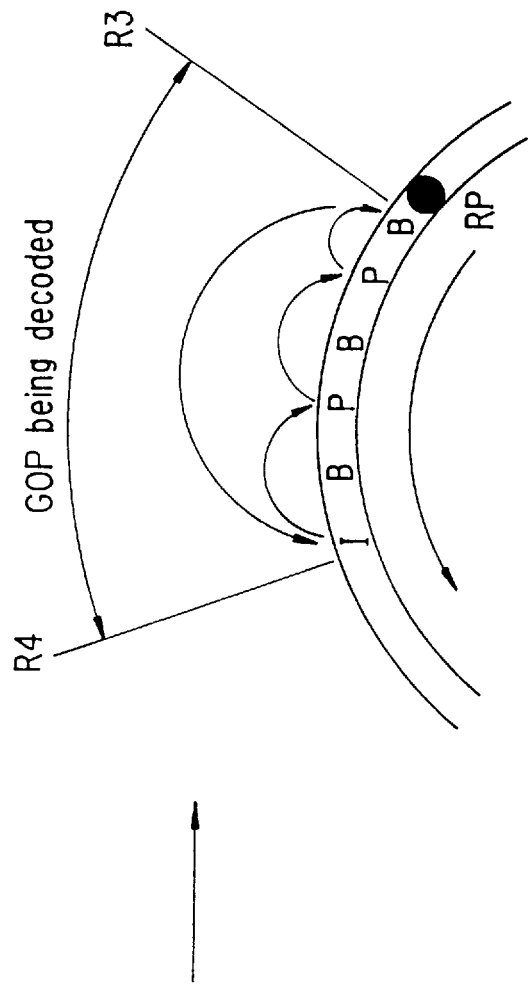
FIGS. 7a and 7b are diagrams for explaining a motion of the read pointer during the reverse reproduction in detail in the data reproducing apparatus of the present invention.
Figure 7A:
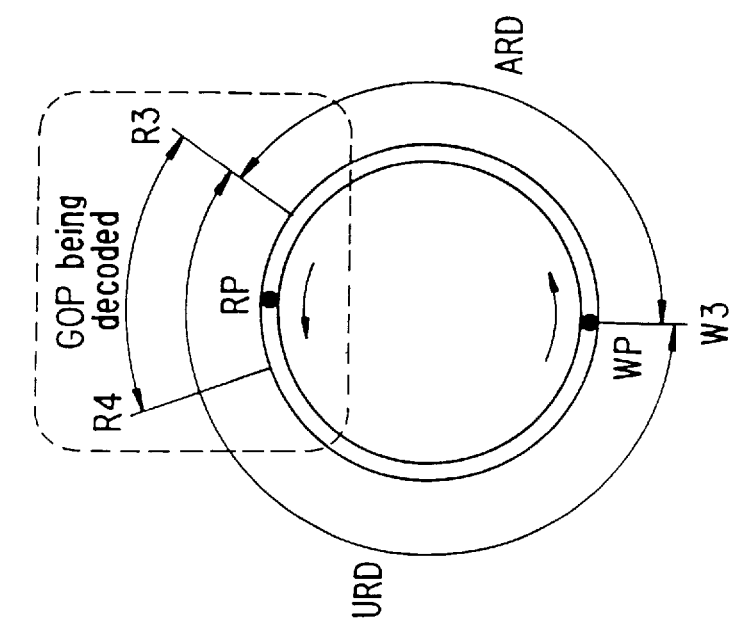

FIG. 7 shows detailed motions of the read pointer RP during such reverse reproduction and FIG. 8 shows detailed motions of the write pointer WP. As shown in those figures, each decoded frame may be stored in the frame memories M1, M2 and M3 as shown in FIG. 3 through the motions of the read pointer RP and the write pointer WP. FIG. 7a is the same figure FIG. 6a and a part surrounded by a broken line in the figure is enlarged and shown as FIG. 7b. As shown in the figure, the read pointer RP jumps from the address position R3 to the address position R4 in the reproducing direction in decoding a GOP to read I picture at the head of the GOP.

Next, the read pointer RP is caused to jump once in the direction reverse to the reproducing direction to read P picture, to jump once in the same direction to read next P picture and to read B picture adjoining on the side of the address position R3. Then, the read pictures are decoded sequentially by the decoder 5 and the decoded frames are stored in the frame memories M1, M2 and M3 as shown in FIG. 3. While the pictures are thus decoded toward the past in a unit of GOP in the reverse reproduction mode, the pictures are read and decoded in the direction reverse to the reproducing direction within the GOP because each picture referenced during coding has to be decoded first as described before.

Figure 8B:
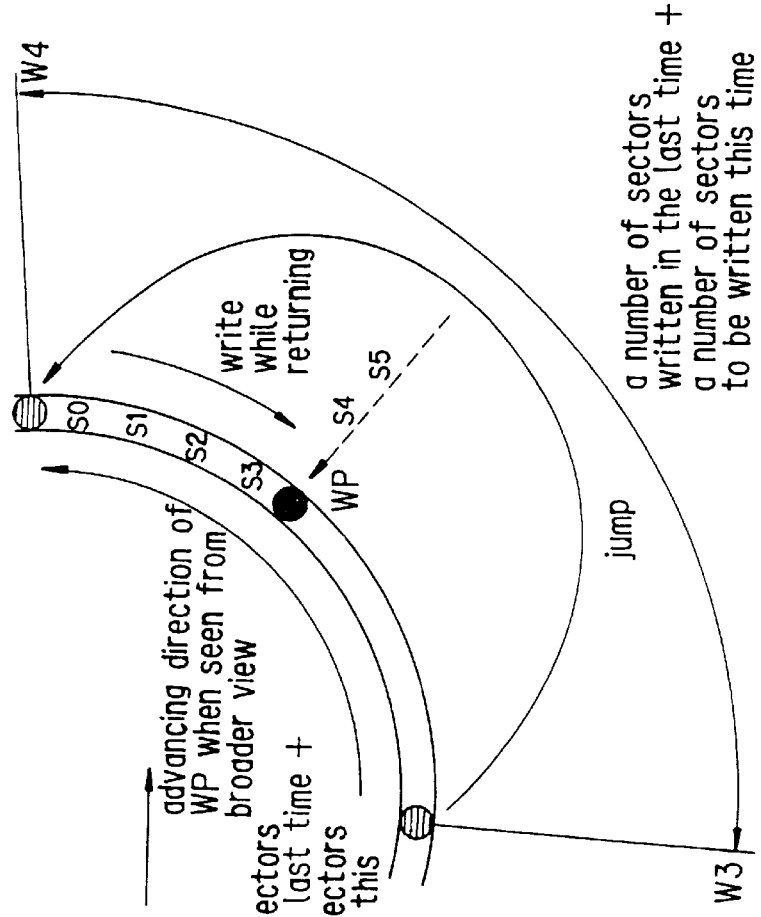
FIGS. 8a and 8b are diagrams for explaining a motion of the write pointer during the reverse reproduction in detail in the data reproducing apparatus of the present invention.
Figure 8A:
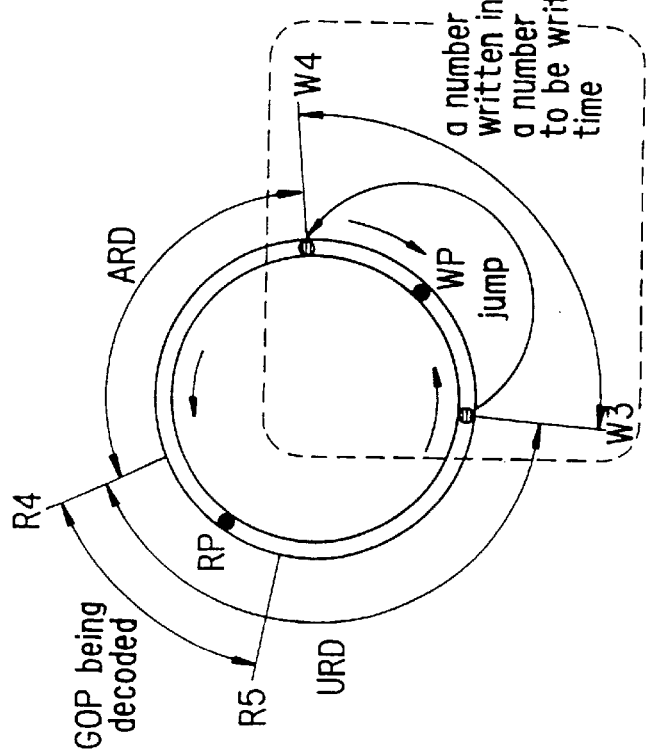
Figure 9:
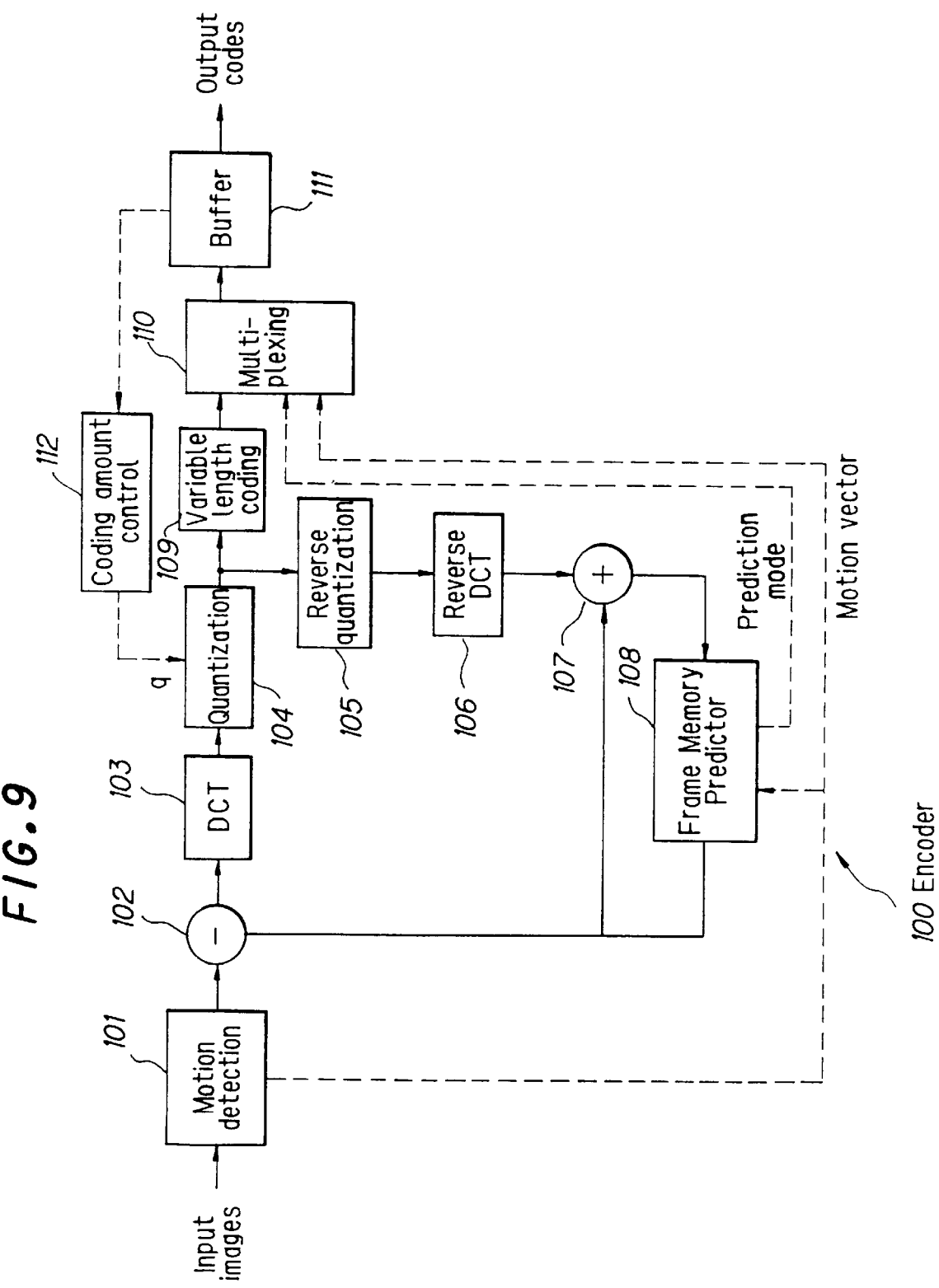
FIG. 9 is a diagram showing a structural example of an encoder for coding digital video signals by the MPEG method.

FIG. 8a shows the same state as that shown in FIG. 6c, wherein a part shown by a broken line is enlarged and shown as FIG. 8b. In the figure, the write pointer WP positioned at the address position W3 jumps to the address position W4 in writing data. It is the address position where data of a number of sectors of the sum of a number of sectors written in the last time and a number of sectors to be written this time may be written in the area between the address position W3 and the address position W4 as described before. Then, returning from the address position W4, the sectors S0, S1, S2, S3, S4, and S5 . . . are written.

Figure 5A:
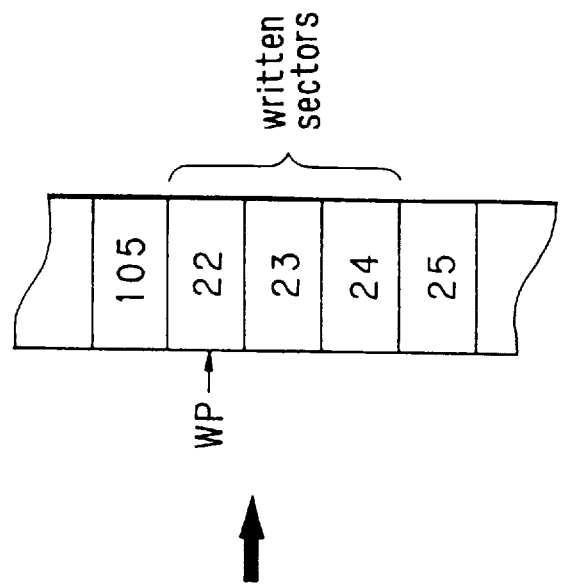
FIGS. 5a and 5b are diagrams for explaining motions of the write pointer during the reverse reproduction in the data reproducing apparatus of the present invention.
Figure 5B:
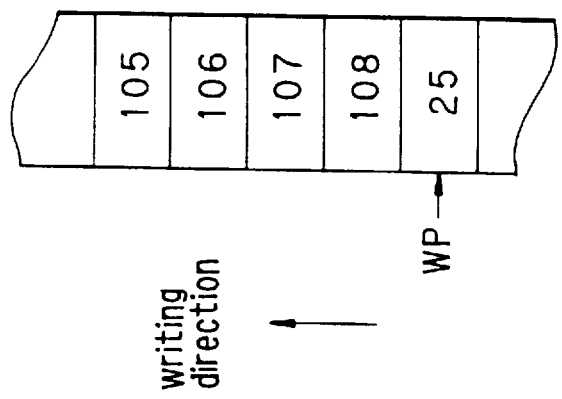

While the data within the GOP is arranged and written in the same direction as during the normal reproduction, when the reverse reproduction mode is specified, the control circuit 8 controls the write pointer WP so as to write from the next sector which has been scheduled to be overwritten during the normal reproduction. That is, when it has been scheduled to write Sector 25 during the normal reproduction as shown in FIG. 5a for example and when three sectors Sector 22 to Sector 24 are to be written, the write pointer WP is jumped to the position of Sector 106 to write Sector 22 thereon and Sectors 23 and 24 are written on Sectors 107 and 108 as shown in FIG. 5b.

Note that it is natural that the unread data area (or the already-read data area) during the normal reproduction is reversed to the already-read data area (or the unread data area) during the reverse reproduction. It becomes possible to quickly respond not only to frame feeding in the reverse reproduction mode but also to variable-speed reproductions such as a slow reproduction and a double-speed reproduction by controlling the writing/reading of the ring buffer 4 by the control circuit 8 so that the storage area of the ring buffer 4 is divided almost into half for the unread data area and for the already-read data area as described above.

Further, it becomes possible to respond to the variable-speed reproduction not only during the reverse reproduction but also during the normal reproduction. Note that when the variable-speed reproduction mode is specified, it is possible to respond to the variable-speed reproduction such as a double-speed reproduction by reproducing only I pictures or only I pictures and P pictures.

Figure 13:
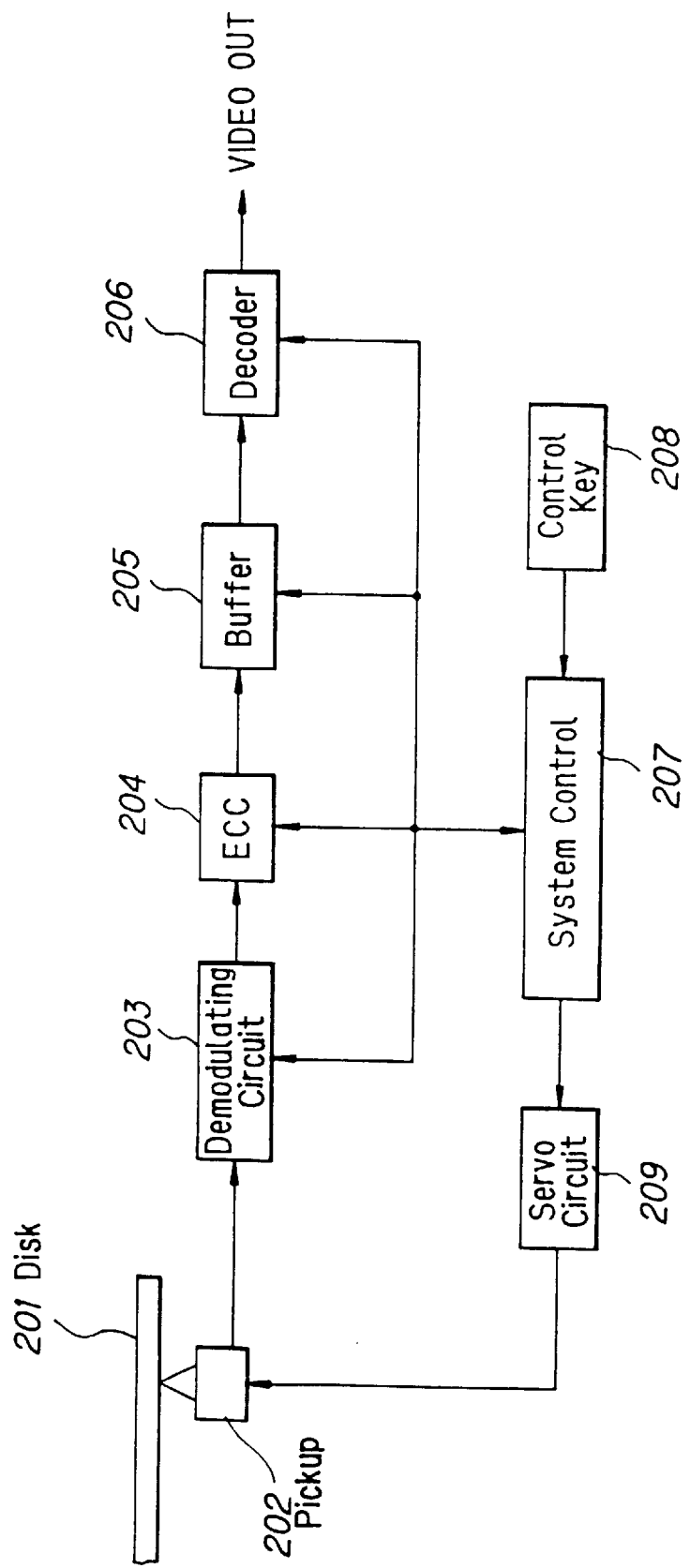
FIG. 13 is a system block diagram showing a structure of another preferred embodiment of the data reproducing apparatus of the present invention.

FIG. 13 is a system diagram showing a data reproducing apparatus according to another embodiment of the present invention.

In the figure, digital video data, digital audio data or the like is compressed and recorded in a disk (DV) 1 by means of the MPEG method or the like. A pickup 202 reads the recorded digital data from the disk 201; a demodulating circuit 203 demodulates the read digital data; an error correction circuit (ECC) 204 corrects errors using error correction codes; a buffer 205 is inserted to buffer a rate on the decoder side which differs from a rate on the reading side; and a decoder 206 decodes and outputs the coded data into image signals to be displayed on a display unit (VIDEO OUT).

Further, a system control 207 sends various control signals to a servo circuit 209 to control focus, tracking and threading; etc., control keys 208 are buttons such as reproduction button, stop button, double-speed reproduction button, reverse reproduction button operated by a user; the servo circuit 209 controls the focus, tracking and threading of the pickup 202 under the system control 207.

Operations of the data reproducing apparatus constructed as described above will be explained. The disk 201 is controlled to turn with a predetermined number of revolutions by a spindle motor not shown, and the recorded digital data is read out from it when laser beam is irradiated from the pickup 202 to the disk 201. This digital data is recorded in the unit of sector shown in FIG. 11 as described before, and a sector sync, sector address and sector header are appended at the head of each sector. While the pickup 2 read each sector as described above, the servo circuit 209 performs the focus control and tracking control based on focus error signal and tracking error signal obtained from the demodulating circuit 203 under the control of the system control 207.

The sector demodulated by the demodulating circuit 203 enters the ECC 204 for correction of its error. Its position, where it is written, is controlled from a detected sector address of the data and is written to the buffer 205. This buffer 205 is adapted to have a memory capacity capable of storing at least 2 GOPs of digital data. GOP data in the frame sequence shown in FIG. 10*b* is read sequentially out of the buffer 205 and I pictures, P pictures and B pictures composing the GOP are decoded by the decoder 206 to reproduce and output an image signal of each frame (VIDEO OUT).

Thus, when the normal reproduction button of the control key 208 is manipulated, the video signals output from the decoder 206 (VIDEO OUT) are supplied to the display unit, reproducing the video images on the display unit.

Figure 14:
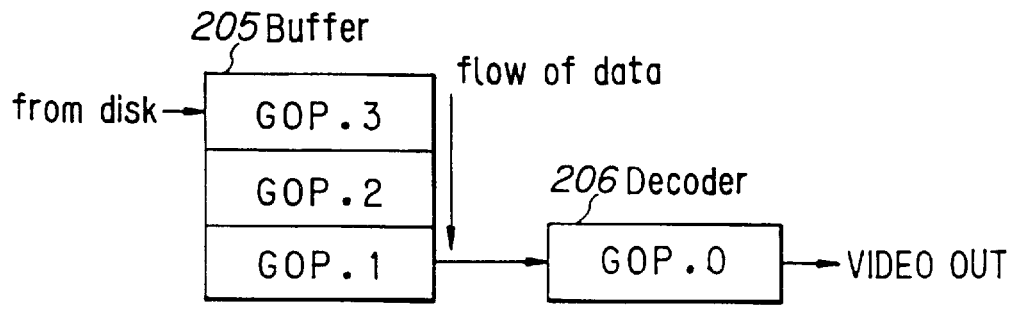
FIG. 14 is a schematic diagram showing operations of a buffer and a decoder during the normal reproduction in the data reproducing apparatus of the present invention.

FIG. 14 diagrammatically shows the operations of the buffer 205 and the decoder 206. In this case, assume that the buffer 205 has a memory capacity of at least two GOPs.

In the figure, sectors read out of the disk 201 are written to the buffer 205. That is, three GOPs are stored in the buffer 205 in order of GOP. 1, GOP. 2 and GOP. 3. Then, GOP. 0 read out of the buffer 205 is supplied to and decoded by the decoder 206, outputting decoded image signals (VIDEO OUT).

When the decoder 206 finishes to decode GOP. 0, GOP. 1 which follows GOP. 0 is read out of the buffer 205 and is supplied to the decoder 206. Then, the system control 207 controls the pickup 202 access to the disk 201 and to read GOP. 4, new data to be stored in the buffer 205. The video signals are thus reproduced and displayed on the display unit one after another. Note that the rate at which the data is read out of the disk 201 is set to be faster than the rate at which the video signals are output from the decoder 206. When a certain amount of data is stored in the buffer 205, the system control 207 puts the reproduction from the pickup 202 into a pause mode and when data stored in the buffer 205 becomes less, it puts to the reproduction mode to store data in the buffer 205.

By the way, while a ratio between a compressed coding amount before being decoded by the decoder 206 and a coding amount after the decoding is made to vary corresponding to a complexity and flatness of video signals as described before, because the rate of the video signals decoded and output is of generally a constant display speed, a rate of the amount of supply of the compressed coded signals input to the decoder 206 is made to be random corresponding to the complexity and flatness of the video signals in order for the decoded and output video signals to be continuous. The buffer 205 is provided to buffer such varying rates and is controlled so that new GOP is written to the buffer 205 when an empty area is brought about as described above, because the rate for writing data to the buffer 205 is normally set to be higher than that for outputting data from the decoder 206.

Figure 15:
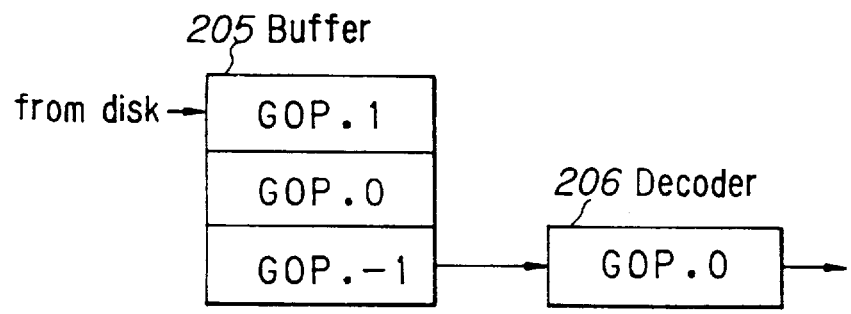
FIG. 15 is a schematic diagram showing operations of the buffer and the decoder during the still mode in the data reproducing apparatus of the present invention.

FIG. 15 diagrammatically shows operations of the buffer 205 and the decoder 206 when the control key 208 is operated and a still mode is specified. When the still mode is specified, generally the mode is more likely to be shifted to the reverse reproduction mode or the like to see images before and after that moment by feeding frames. As shown in the figure, when the still mode is specified, the system control 207 controls the pickup 202 to access the disk 201 and to read GOP. 0 and GOP. −1 which precedes GOP. 0 time-wise and writes them to the buffer 205. Then, when the control key 208 is operated and a reverse frame feeding button is operated following the still mode, the decoder 206 can read GOP. −1 out of the buffer 205, which is to be decoded immediately after finishing the decoding of the GOP. 0.

Accordingly, because the decoder 206 can be supplied with GOP. −1 immediately after finishing the decoding of GOP. 0 and can supply image signals (VIDEO OUT) of decoded GOP. −1 quickly to the display unit, the user feels no sense of incompatibility when he/she specifies the reverse reproduction mode. Note that the reason why GOP. 0 being decoded is also written to the buffer 205 is because pictures composing GOP. 0 already decoded need to be decoded and I picture which is positioned at the head of GOP. 0 is necessary for the decoding as described before. When it is specified to feed frames in the normal direction after the stop mode, GOP. 1 is read out of the buffer 205 following GOP. 0 being decoded and is supplied to the decoder 206.

Figure 16:
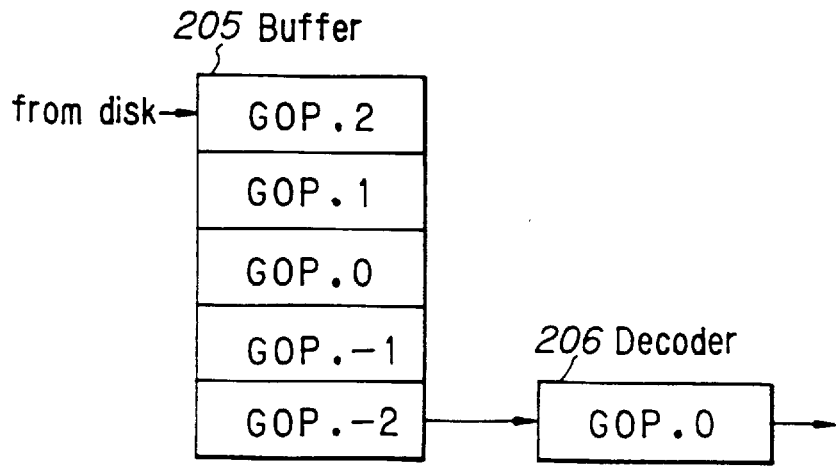
FIG. 16 is a schematic diagram showing exemplary operations of the buffer and the decoder during the still mode in the data reproducing apparatus of the present invention.

Further, it becomes possible to accommodate not only the frame feeding but also variable-speed reproductions such as a double-speed reproduction by increasing the capacity of the buffer 205 as shown in FIG. 16 and by writing GOP. 0, GOP. −1 and GOP. −2 to the buffer 205 by accessing the disk 201 by controlling the pickup 202 when the still mode is specified and when GOP. 0 is being decoded as shown in FIG. 16. Furthermore, it becomes possible to accommodate the variable-speed reproduction not only in the reverse reproduction mode but also in the normal direction reproduction mode. Note that when the variable-speed reproduction mode is specified, it becomes also possible to accommodate the variable-speed reproduction such as the double-speed reproduction by reproducing only I pictures or only I pictures and P pictures for example.

While preferred embodiments have been described, variations thereto will occur to those skilled in the art within the scope of the present inventive concepts which are delineated by the following claims.

What is claimed is:

1. A method for reproducing information represented by data recorded on a disk, the recorded data being reproduced from said disk and being stored in storage means, said method comprising the steps of:

retrieving the stored data from said storage means, wherein the stored data already retrieved from said storage means and the stored data yet unretrieved from said storage means each occupy substantially half of a total storage capacity of said storage means, the stored data being composed of a plurality of sectors in said storage means, each sector in said plurality of sectors containing a fixed amount of data, and wherein said storage means includes a starting address position at which the recorded data is stored during a current storage operation, the starting address position advanced for each successive storage operation by a value representing a sum of a number of said sectors stored during a preceding storage operation and a number of said sectors stored during the current storage operation, when the information is reproduced in reverse; and decoding the retrieved data.

2. The method according to claim 1, wherein the current storage operation in said storage means proceeds from the starting address position in a first direction opposite to a second direction in which the stored data is retrieved from the storage means.

3. Apparatus for reproducing information represented by data recorded on a disk, comprising:

reproducing means for reproducing the data from the disk;

demodulating means for demodulating the reproduced data;

storage means for storing the demodulated data, wherein the stored data is composed of a plurality of sectors in said storage means, each sector in said plurality of sectors containing a fixed amount of data, and wherein said storage means includes a starting address position at which the recorded data is stored during a current storage operation, the starting address position advanced for each successive storage operation by a value representing a sum of a number of said sectors stored during a preceding storage operation and a number of said sectors stored during the current storage operation, when the information is reproduced in reverse;

decoding means for decoding the stored data retrieved from said storage means; and control means for controlling said storage means such that the stored data already retrieved from said storage means and the stored data yet unretrieved from said storage means each occupy substantially half of a total storage capacity of said storage means.

4. The apparatus according to claim 3, wherein the current storage operation in said storage means proceeds from the starting address position in a first direction opposite to a second direction in which the stored data is retrieved from the storage means.

5. A method for reproducing video information represented by data recorded on a disk, the recorded data retrieved from said disk and stored in a buffer in Groups of Pictures (GOPs), said buffer having a storage capacity of at least two GOPs, said method comprising the steps of:

retrieving at least one GOP from said disk while decoding a second GOP which temporally immediately succeeds said one GOP; and storing said one GOP in said buffer when image information reproduction is paused during a special reproduction mode.

6. The method according to claim 5, wherein the special reproduction mode is a reverse reproduction mode.

7. An apparatus for reproducing information represented by data recorded on a disk, comprising:

retrieving means for retrieving the recorded data from the disk;

demodulating means for demodulating the retrieved data;

buffer means for storing the demodulated data and having a storage capacity of at least two Groups of Pictures (GOPs); and decoding means for decoding the stored data supplied from said buffer means;

wherein at least one GOP is retrieved by said retrieving means from said disk while a second GOP which temporally immediately succeeds said one GOP is decoded by said decoding means, wherein said one GOP is stored in said buffer means when information reproduction is paused during a special reproduction mode.

8. The apparatus according to claim 7, wherein the special reproduction mode is a reverse reproduction mode.

* * * * *